US006396534B1

(12) United States Patent
Mahler et al.

(10) Patent No.: US 6,396,534 B1
(45) Date of Patent: May 28, 2002

(54) ARRANGEMENT FOR SPATIAL MONITORING

(75) Inventors: Hansjürg Mahler, Hombrechtikon; Martin Rechsteiner, Männedorf, both of (CH)

(73) Assignee: Siemens Building Technologies AG, Mannedorf (CH)

( * ) Notice: Subject to any disclaimer, the term of this patent is extended or adjusted under 35 U.S.C. 154(b) by 0 days.

(21) Appl. No.: 09/258,731

(22) Filed: Feb. 26, 1999

(30) Foreign Application Priority Data

Feb. 28, 1998 (EP) ........................................ 98103542
Mar. 31, 1998 (CH) ........................................ 0767/98

(51) Int. Cl.$^{7}$ ........................................ H04N 7/18
(52) U.S. Cl. ........................................ 348/155
(58) Field of Search ........................ 348/143, 154, 348/155; H04N 7/18

(56) References Cited

U.S. PATENT DOCUMENTS

| | | | | |
|---|---|---|---|---|
| 5,473,368 A | * 12/1995 | Hart | | 348/155 |
| 5,581,297 A | * 12/1996 | Koz et al. | | 348/143 |
| 5,982,418 A | * 11/1999 | Ely | | 348/154 |

FOREIGN PATENT DOCUMENTS

| | | |
|---|---|---|
| DE | 29607184 | 8/1996 |
| DE | 29718213 | 1/1998 |
| EP | 0543148 | 5/1993 |
| EP | 0772168 | 5/1997 |
| GB | 2064189 | 6/1981 |
| GB | 2309133 | 7/1997 |
| WO | 9706453 | 2/1997 |

OTHER PUBLICATIONS

Patent Abstracts of Japan, Publication No. 02007195 of Nov. 1, 1990 in the name of Nandachi Toshiyuki, entitled Abnormality Monitoring System.

Sunetra K. Mendis et al., "A 128 × 128 CMOS Active Pixel Image Sensor for Highly Integrated Imaging Systems", IEDM 93, pp. 583–586.

R. H. Nixon et al., "128 × 128 CMOS Photodiode–type Active Pixel Sensor with On–chip Timing, Control and Signal Chain Electronics", SPIE vol. 2415, pp. 117–123.

* cited by examiner

*Primary Examiner*—Howard Britton
(74) *Attorney, Agent, or Firm*—BakerBotts LLP

(57) ABSTRACT

Included in an arrangement for spatial monitoring or surveillance are an image sensor (5), a presence/movement detector (6), and control and evaluation electronics (2) with a processor stage (4) for evaluating signals from the sensor (5) and detector (6) in combination. Imaged objects can be categorized on the basis of their geometry and movement. The signal from the detector (6) can be used in interpreting sensed images.

22 Claims, 2 Drawing Sheets

ARRANGEMENT FOR SPATIAL MONITORING

TECHNICAL FIELD

This invention relates to spatial monitoring or surveillance and, more particularly, to an arrangement including an image sensor and a presence/movement detector.

BACKGROUND OF THE INVENTION

In a monitoring arrangement disclosed in European Patent Document EP-A-0 772 168, which preferably is battery powered, a presence/movement detector serves to reduce current consumption by switching on an image sensor only when necessary. In a video monitoring system disclosed in United Kingdom Patent Document GB-A-2 309 133, an image sensor is connected to a video recorder. A presence/movement detector serves for more economical utilization of the magnetic tape on which images are stored, by switching on the video recorder only as needed. Such known surveillance arrangements store image information for evaluation by an attendant, which task is known to be monotonous and tedious. The arrangements lack intelligence, as events are not differentiated with respect to notification relevancy.

An arrangement disclosed in German Patent Document DE-U-297 18 213 includes an image sensor, a still-image generator and storage stage, a difference-image generator stage, and an image analyzer stage. An analytical result is compared with predetermined notification relevancy criteria, for a positive result to be reported to a central unit. As image sensor signals are automatically monitored for notification relevancy, this arrangement does have surveillance intelligence, with the central unit being notified of positive results only. However, as the image sensor depends on sufficiently intensive visible or near-infrared radiation, this arrangement may not be sufficiently robust in meeting security requirements.

SUMMARY OF THE INVENTION

In a spatial monitoring arrangement in accordance with the invention, intelligent monitoring has optimized discrimination and robustness. The arrangement includes at least one image sensor and at least one presence/movement detector connected to control and evaluation electronics including a processing stage for on-site, combined evaluation of sensor and detector signals.

This dual- or multi-criteria monitoring arrangement has significant advantages over known dual-notification devices, as well as over pure image sensors. The arrangement is significantly more robust than known dual-notification devices in which spatial resolution is coarse or absent, with the result that it is often impossible to differentiate between humans and animals. Furthermore, for intelligent monitoring the image sensor can provide for classifying objects based on their geometry and movement, and can provide for verification and storage of events for retrieval later.

As compared with pure image sensors, the arrangement in accordance with the invention is advantageous in that it can remain fully functional as a presence/movement detector even under poor lighting conditions. Furthermore, the detector can assist in interpreting difficult situations by automated processing.

In a preferred embodiment of an arrangement in accordance with the invention, signals from the image sensor and the presence/movement detector first are evaluated separately, before their combined evaluation.

A further preferred embodiment of an arrangement in accordance with the invention includes a CMOS (complementary metal-oxide-semiconductor) image sensor, preferably an active pixel sensor. Among advantages of CMOS image sensors over CCD (charge-coupled device) cameras are a power consumption which is lower by several orders of magnitude and the ability to access individual pixels. This latter feature enables readout of images with reduced resolution and of mere portions of interest of an image, whereas with CCD cameras the pixels can be read out only line by line.

In yet a further preferred embodiment of an arrangement in accordance with the invention, means is included for determining the distance of a detected object from the presence/movement detector, and passing the distance signal to aprocessing stage.

DETAILED DESCRIPTION

Figure 1:
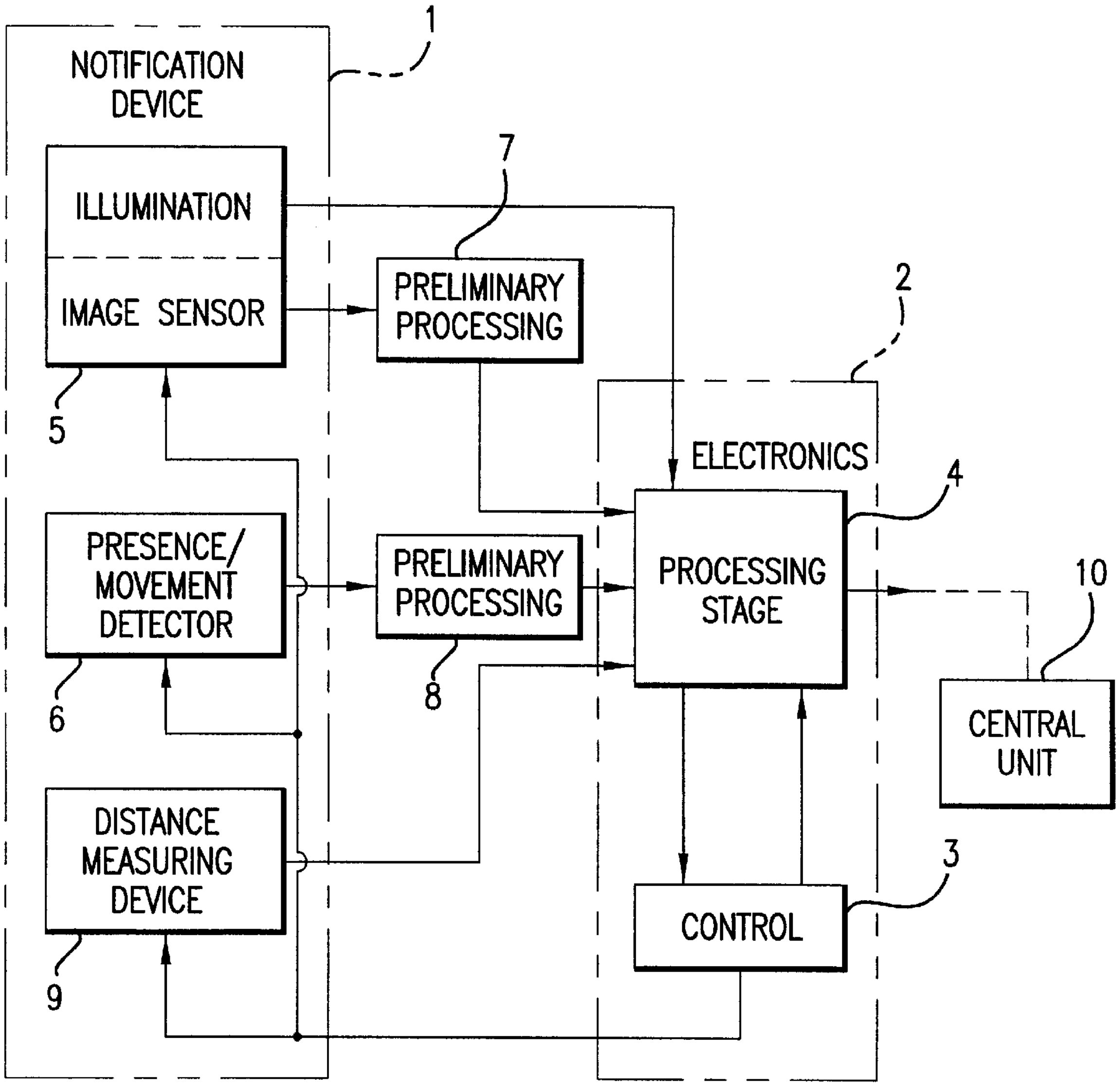
FIG. 1 is a block diagram of an arrangement in accordance with a preferred embodiment of the invention.

FIG. 1 schematically shows a multi-criteria movement notification device 1, control and evaluation electronics 2, a control stage 3, and a processing stage 4 for on-site evaluation of the signals from the notification device 1. The representation in FIG. 1 is functional, without limiting the physical arrangement of features. Typically, for example, certain parts of the electronics 2 can be physically incorporated in the notification device 1, especially where the notification device 1 provides for processing or preliminary evaluation of signals.

The notification device 1 includes an image sensor 5 and a presence/movement detector 6. The image sensor 5 has means for measuring the illumination level in an area to be monitored. Preliminary processing stages 7 and 8 are connected after the image sensor 5 and the presence/movement detector 6, respectively, which stages may be physically incorporated in the notification device 1 or in the processing stage 4. Signals pass from the preliminary processing stages 7 and 8 to the processing stage 4 which also receives an illumination signal from the illumination measuring means of the image sensor 5.

The notification device 1 may optionally include a distance measuring device 9 for determining the distance of events recorded by the presence/movement detector 6. The processing stage 4 is autonomous, for on-site decision making and/or display of images recorded by the image sensor 5. Preferably, the processing stage has means for transmitting the images to a spatially remote central unit 10 for further verification, for example.

Operationally, the presence/movement detector 6 can be based on any known detector principle, e.g. passive infrared, active infrared, microwave, ultrasound, or any suitable combination thereof. The image sensor 5 is sensitive to visible light and to near and far infrared radiation including thermal radiation, and can be a CCD, CID (charge injection device) or CMOS, for example.

Preferably, a special CMOS image sensor known as APS (active pixel sensor) is used, for low power consumption and accessing of individual pixels. Additional, application-specific analog or digital functions, e.g. simple image processing, filtering and illumination control can be included readily in an APS. With respect to APS, see Sunetra K. Mendis et al., "A 128×128 CMOS Active Pixel Image Sensor for Highly Integrated Imaging Systems", IEDM 93-538 and R. H. Nixon et al., "128×128 CMOS Photodiode-Type Active Pixel Sensor With On-Chip Timing, Control and Signal Chain Electronics", SPIE Vol. 2415/117.

The image sensor 5 is aimed at an area to be monitored. It gathers image information of the area, digitizes the image, and stores the image as a reference image in memory. If an APS image sensor 5 has 128×128 pixels, for example, then a wide-angle optics arrangement would make correspond one image pixel to an area of approximately 12×12 cm at a distance of 15 m from the image sensor 5. This degree of resolution is sufficient for distinguishing fairly reliably between human and animal shapes.

The ability to recognize the presence of a person at a distance of 15 m is highly advantageous, and monitoring an area of about 15×15 m at this distance is entirely feasible. When the arrangement is in the active state, the image sensor 5 keeps producing images of the monitored area at intervals of a fraction of a second. Images are stored for a set time period, and are compared with the reference image and/or with one another. Preferably, storing is controlled so that those images which in combination with the signal from the presence/movement detector 6 have triggered an alarm signal, as well as preceding and/or following images are stored until further notice. Other images may be automatically erased after the set time period.

Storing of the triggering images is advantageous for later reconstruction and checking of events, and potentially also for identifying any perpetrator(s). Such storing requires relatively little storage capacity, without exceeding currently available capacity.

The electronics 2 preferably comprises an interface (not shown) for image readout with a PC, for example. Reconstruction of notification-triggering events and perpetrator identification can be facilitated further if images preceding and/or following notification are stored not only in the electronics, but additionally are transmitted to a separate unit spatially separate from the electronics. This unit may be the central unit 10, a nearby police station, a security station, or even a concealed secret unit in a building being monitored. Perpetrators should bear the risk of a record being made of their presence and their doings that can be examined by the police, and of the record being held not only in a monitoring arrangement proper but also at a site unknown and inaccessible to them.

To produce a usable image even under poor lighting conditions, the image sensor 5 is optimized for high light sensitivity and a wide dynamic range, for adequate differentiation of details at high bright/dark contrast. Functions integrated on an APS chip can include an automatic electronic lock with a dynamic range of 1:1000.

The presence/movement detector 6 serves for compensating potential shortcomings of the image sensor 5, e.g. of failing to provide image information below a critical illumination level, or of pronounced image changes due to causes other than the presence of an intruder. For example, illumination conditions may change drastically due to lightning, street lights being switched on or off, passing vehicles with high-beam headlights, and the like. In such cases the robustness of the notification device 1 is significantly enhanced by taking into account the signal from the presence/movement detector 6. This can be effected by combined evaluation of the signals from the image sensor 5 and the presence/movement detector 6 in the processing stage 4.

Before combined evaluation it is advantageous to subject the signals from the image sensor 5 and the presence/movement detector 6 to a preliminary evaluation in the preliminary processing stages 7 and 8 which can be integrated in the respective sensor 5 and detector 6 or in the processing stage 4. In such preliminary evaluation the signals from the presence/movement detector 6 are converted into a format appropriate for combined evaluation with the signal from the image sensor 5, and are classified according to their strength. When included in the notification device 1, a distance measuring device 9 is activated by the processing stage 4 via the control stage 3 in the presence of a signal from the presence/movement detector 6 of sufficient strength. It supplies to the processing stage information on the distance of a detected event or object. Such distance information can serve in determining the size and type of an object sensed by the image sensor 5, e.g. to distinguish between humans and animals.

In the image sensor 5, preliminary evaluation can be integrated as hardware and/or in the form of a processor kernel on the APS chip. The number of pixels that have changed as compared with the reference image, their accumulation or clustering, and pixel cluster features are determined by preliminary signal evaluation. The reference image can be updated with changes whose stability has been verified. Such updating can be made with greater confidence if signals from the presence/movement detector 6 are taken into consideration for this purpose.

Thus, at the input of the processing stage 4 there are present (i) a signal from the presence/movement detector 6 classified according to signal strength, (ii) an image signal from the image sensor 5 containing information on the number of changed pixels and on pixel cluster features, and possibly (iii) a signal from the distance measuring device 9 representing the distance of the event that triggered the signal from the presence/movement detector 6. Furthermore, the processing stage 4 continuously receives information from the image sensor 5 on the average level of illumination in the monitored area, for combined signal evaluation with increased weighting of the signals from the illumination-independent presence/movement detector 6 as a function of decreasing illumination.

Combined evaluation of the signals results in an alarm/non-alarm decision at the output of the processing stage 4, taking into account parameters or criteria such as image content, overall illumination, and information from the presence/movement detector 6 and its change and/or previous history. In the following, such criteria will be designated as "global". Advantageously, in decision making, plausibility relationships can be considered. E.g., if brightness and image content change rapidly and markedly, but the signal from the presence/movement detector 6 is weak, then the new image can be checked for stability and indications of movement. If there is no such indication, it is likely that there has been a mere change of illumination, without cause for alarm. A change of illumination can be verified readily on the basis of the stability of the new image.

Image changes may be subdivided into three categories, depending on the number of pixels changed in absolute terms or per cluster. If the number is small, the condition can be regarded as sub-critical, and no alarm or further evaluation is warranted. If the number is intermediate, a detailed analysis is carried out. If the number is large, the global criteria are checked. A detailed analysis is performed only if the global criteria are inconclusive.

Preferably, the detailed analysis includes static and dynamic analysis of clusters, i.e. with respect to their size, topology and orientation, as well as with respect to changes in their size, shape and position.

Such analysis seeks to extract from the fixed reference image those objects that have moved or are moving, and to categorize them unambiguously for alarm relevancy. E.g., for distinguishing between humans and animals, relevant clusters can be categorized on the basis of their height-to-width ratio, as humans are relatively taller and animals wider in a side view. In a frontal view it is more difficult to distinguish between humans and animals. In addition to static analysis based on such quantitative criteria, dynamic analysis can take typical movement patterns of humans and animals into account, as stored for comparison with movement patterns detected by the image sensor 5.

Figure 2:
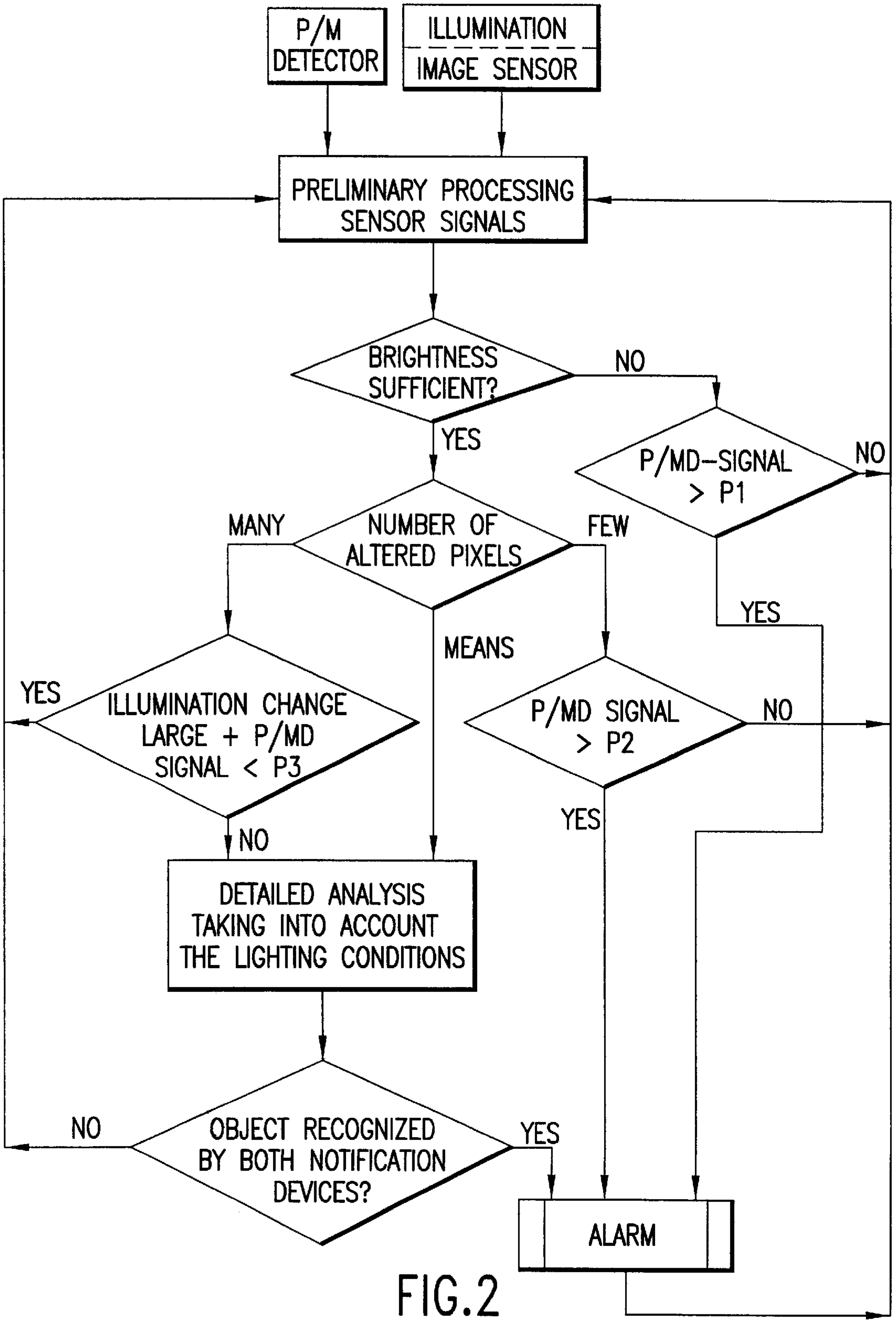
FIG. 2 is a flow diagram of signal processing in the embodiment according to FIG. 1.

The flow diagram of FIG. 2 exemplifies signal processing in an arrangement for spatial monitoring according to FIG. 1 but without a distance measuring device. For simplicity, the preliminary processing stages 7 and 8 are understood as integrated in the processing stage 4, for preliminary processing of the signals from the image sensor 5 and from the presence/movement detector 6 in the processing stage 4 rather than at the source.

By preliminary evaluation of a sensor signal it can be determined whether there is sufficient spatial brightness for the image sensor 5 to yield an adequate image. Otherwise, only the signal from the presence/movement (P/M) detector 6 will be used for further evaluation, e.g. by comparing it with an alarm threshold value $P_1$ which is relevant for the actual detector, e.g. a passive infrared detector. If the signal from the presence/movement detector 6 is greater than $P_1$an alarm is triggered. Otherwise, a new processing cycle is initiated without regard to the current sensor signal.

If spatial brightness is sufficient, the number of pixels is determined which have changed as compared to the reference image. If this number is zero or negligible, the signal from the presence/movement detector 6 is compared with a threshold value $P_2$ where $P_2>P_1$. If the signal from the presence/movement detector 6 is greater than $P_2$ an alarm is triggered, otherwise processing of the current sensor signal is discontinued. Signals may be analyzed over an extended time interval.

If the number of changed pixels is neither negligible nor large, a detailed analysis is performed taking into account the illumination conditions, followed by a determination as to whether an object has been detected by both notification devices, the image sensor 5 and the presence/movement detector 6. If this is the case an alarm is triggered, otherwise processing of the respective sensor signal is discontinued.

If the number of pixels changed as compared with the reference image is large, it is determined whether there has been a marked change in the level of illumination. This determination can be based on illumination measurement by the image sensor 5. It is determined further whether the signal from the detector 6 is less than a threshold value $P_3$, where $P_3<<P_1$. If both conditions hold, processing of the sensor signal is discontinued. Otherwise, a detailed analysis is carried out taking into account the illumination conditions, followed by an evaluation as to whether an object has been detected by both notification devices, in which case an alarm is triggered. Otherwise, processing of the respective sensor signal is discontinued.

Processing as described results in significantly enhanced differentiation between humans and domestic animals and insects, and major sources of false alarms are eliminated. Differentiation is enhanced further still if the size of a detected object is determined, specifically using a distance signal.

What is claimed is:

1. An arrangement for monitoring a spatial region, comprising:

at least one image sensor for the region;

at least one presence/movement detector for the region; and control and evaluation electronics connected for receiving respective sensor and detector signals and including processing means for evaluating the sensor and detector signals jointly for an alarm condition.

2. The monitoring arrangement according to claim 1, further comprising means for evaluating the sensor and detector signals separately before evaluating them jointly.

3. The monitoring arrangement according to claim 2, wherein the means for separately evaluating the sensor signal is included with the sensor.

4. The monitoring arrangement according to claim 2, wherein the means for separately evaluating the sensor signal is included with the processing means.

5. The arrangement according to claim 2, wherein the means for separately evaluating the detector signal is included with the detector.

6. The monitoring arrangement according to claim 2, wherein the means for separately evaluating the detector signal is included with the processing means.

7. The monitoring arrangement according to claim 1, wherein the image sensor is a CMOS sensor.

8. The arrangement according to claim 7, wherein the image sensor is an active pixel sensor.

9. The monitoring arrangement according to claim 1, further comprising a memory for storing a critical image which is sensed by the image sensor on the alarm condition.

10. The monitoring arrangement according to claim 9, further comprising an interface for stored-image readout.

11. The monitoring arrangement according to claim 10, wherein the interface is to a PC.

12. The monitoring arrangement according to claim 9, further comprising means for transferring a sensed image to a unit that is spatially separated from the monitoring arrangement.

13. The monitoring arrangement according to claim 9, further comprising a further memory for storing at least one further image sensed by the image sensor before and/or after the critical image.

14. The monitoring arrangement according to claim 13, further comprising an interface for stored-image readout.

15. The monitoring arrangement according to claim 14, wherein the interface is to a PC.

16. The monitoring arrangement according to claim 13, further comprising means for transferring sensed images to a unit that is spatially separated from the monitoring arrangement.

17. The monitoring arrangement according to claim 1, further comprising means for determining distance to an object detected in the region and for communicating the distance to the processing means.

18. The monitoring arrangement according to claim 7, further comprising:

means for evaluating the sensor signals separately before evaluating them jointly with the detector signals; and means for determining how many pixels have changed as compared with a reference image and/or pixel accumulation and/or pixel distribution over a sensed image.

19. The monitoring arrangement according to claim 1, wherein the control electronics includes means for generating criteria for use in evaluating the sensor and detector signals jointly.

20. An arrangement for monitoring a spatial region, comprising at least one presence/movement detector for the region, control and evaluation electronics connected for receiving sensor and detection signals, and processing means for evaluating the sensor and detector signals jointly for an alarm condition and further wherein the control electronics comprise means for generating criteria for determining average illumination of the region and for weighting the detector signal in an inverse relationship to the average illumination for use in evaluating the sensor and detector signals jointly.

21. The monitoring arrangement according to claim 20, wherein the criteria-generating means further comprises means for comparing the average illumination with a threshold ($P_1$) below which the alarm condition will be determined based on the detector signal without regard to the sensor signal.

22. The monitoring arrangement according to claim 20, wherein the control and evaluation electronics further comprises:

means for determining whether brightness in the region is sufficient for imaging;

means for comparing, in case brightness is insufficient, the detector signal with a first threshold ($P_1$);

means for determining, in case brightness is sufficient, a count of how many pixels are different in a sensed image as compared with a reference image and whether the count is low, intermediate or high;

means for comparing, in case the count is low, the detector signal with a second threshold ($P_2$) which is greater than the first threshold ($P_1$);

means for determining, in case the count is high, whether there has been a change in illumination of the region; and means for comparing, in case of a change in illumination, the detector signal with a third threshold ($P_3$) which is less than the first threshold ($P_1$).

* * * * *